United States Patent [19]

Bell

[11] 4,295,376
[45] Oct. 20, 1981

[54] FORCE RESPONSIVE TRANSDUCER

[75] Inventor: Robert L. Bell, Chatsworth, Calif.

[73] Assignee: Besco Industries, Inc., Chatsworth, Calif.

[21] Appl. No.: 965,604

[22] Filed: Dec. 1, 1978

[51] Int. Cl.$^3$ ............................................. G01L 9/12
[52] U.S. Cl. ..................................... 73/724; 361/283
[58] Field of Search ................ 73/717, 718, 723, 724, 73/780; 361/280, 283, 290, 291

[56] References Cited

U.S. PATENT DOCUMENTS

| | | | |
|---|---|---|---|
| 3,140,450 | 7/1964 | Tavis | 73/718 X |
| 3,595,084 | 7/1971 | Bailey | 73/718 X |
| 3,858,097 | 12/1974 | Polye | 361/283 |
| 4,064,550 | 12/1977 | Dias et al. | 73/724 X |
| 4,089,036 | 5/1978 | Geronime | 73/718 X |
| 4,125,027 | 11/1978 | Clark | 73/724 |

FOREIGN PATENT DOCUMENTS 2514511 10/1975 Fed. Rep. of Germany ........ 73/724

Primary Examiner—Charles A. Ruehl
Attorney, Agent, or Firm—Fraser and Bogucki

[57] ABSTRACT

A differential capacitive force responsive transducer provides a substantially linear relationship between transducer output and input variations. A pressure or load to be measured is applied to one surface of a deflectable diaphragm, the opposite surface of which includes at least a pair of electrodes at different positions, such that when the diaphragm flexes there is a differential deflection of the electrodes. A substantially rigid electrode-bearing plate is secured to the electrode-bearing face of the diaphragm by a spacer or spacers in an intermediate flexure region of the diaphragm, to define separate capacitive elements with the diaphragm electrodes. The plate thus moves with the diaphragm, maintaining a fixed spacing at the spacer elements, but with the spacings between the elements varying in opposite senses. With this construction, the transducer can be of low cost, small size, precision manufacture, and use readily deposited thick or thin film electrodes. Moreover the circuits may automatically be adjusted to provide selected nominal zero and range values, so that the transducer can be utilized interchangeably with other transducers in mass production systems. Furthermore, the differential capacitance values obtained from a single transducer can directly provide digital values to a processor, by oppositely varying two variable frequency oscillators, and using the difference frequency to generate pulse counts during successive time intervals.

42 Claims, 11 Drawing Figures

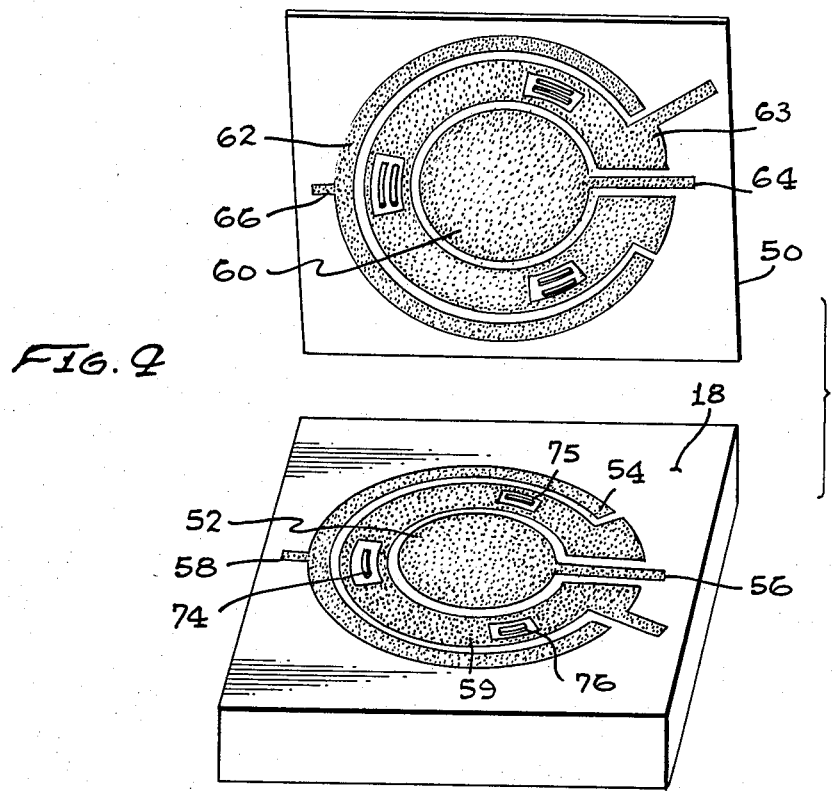
FIG. 4
FIG. 5
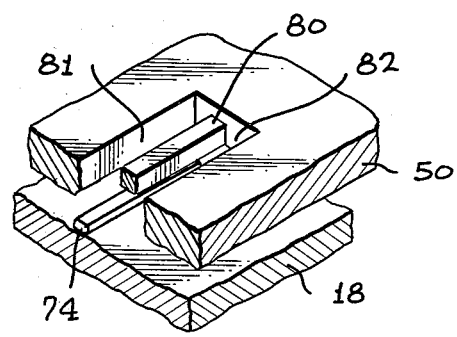
FIG. 6
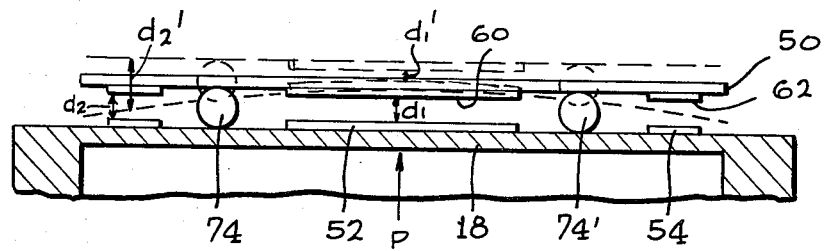

4,295,376

FORCE RESPONSIVE TRANSDUCER

BACKGROUND OF THE INVENTION

This invention relates to force responsive transducers and particularly to differential capacitive transducers that are capable of high linearity and precision operation, but at the same time are amenable to low cost fabrication techniques.

Various capacitive transducers are well known in the art. Many of these transducers include two opposed surfaces, each including an electrode, with each surface being sealed about its periphery, typically with a rim facing in the same direction as the electrode. Pressure is applied to the interior or exterior of the cavity thus formed, with one or more of the electrode-bearing surfaces comprising a deflectable diaphragm. Examples of variations of this technique are shown by the patents to Polye U.S. Pat. Nos. 3,634,727 and 3,858,097, the patent to Birchall 3,952,234 and the patent to Johnston 3,808,480. A high fidelity pressure transducer is revealed in the patent to Dias et al, 4,064,550, in which both the body and the deflectable diaphragm consist of quartz, which is too expensive for general application. All of these transducers present certain problems when one attempts to meet conflicting requirements as to cost, precision, size and interchangeability of transducers in modern systems applications. For example, the spacing between facing electrodes is determined in these devices by the peripheral rim, which must thus be closely controlled but can also interfere with the precise deposition of thin or thick film electrodes. This is only one factor to consider, however, inasmuch as it is desirable to achieve linearity and dynamic range that are at least comparable to existing devices while still having a low cost, mass producible design. In pressure transducers used with computerized carburetion or fuel injection systems, for example, the costs must be at least an order of magnitude lower than that which can be tolerated with instrumentation applications, and yet the linearity and range may have to be comparable. Further, it is highly desirable if not essential that the transducers be interchangeable without adjustment in the field. This means in turn that such interchangeability must be achieved on a mass production basis, without substantially raising costs. It is now common practice in the thin and thick film industries, and in the integrated circuit industry, to utilize computerized control and laser trimming to effect adjustments in electrical parameters so that operative characteristics can be set at predetermined nominal values. Using conventional single ended capacitive designs, however, it is extremely difficult to adjust both the zero setting and the range of a transducer arranged in a circuit to provide a varying frequency output.

Differential capacitor transducers are known, as evidenced by the previously referenced patent to Birchall. In the prior art differential effects are achieved using more than two separated electrode-bearing surfaces. This multiplicity of surfaces requires precision alignment, is expensive to manufacture and is seldom interchangeable. Also known is the patent to Lee et al, U.S. Pat. No. 3,859,575. In this construction, the flexible diaphragm comprises the outer circumferential portion of the end cap of a hollow metal cylinder which can be threaded into a base structure. A central post in the end cap provides a support for a spaced plate which has electrodes in opposition to the metal diaphragm which acts as an electrode. The interior of the hollow cylinder provides the internal volume that can contain the variable pressure fluid. This constuction is extremely difficult to machine to shape, and is inordinately expensive for high volume applications. It does provide a different approach to the problem of controlling the spacing between the capacitive means because it departs from the concept of using a fixed reference surface.

Improved transducers using capacitance effects can be utilized in various types of force, pressure displacement and load measuring applications. There is in general a need for such devices which are extremely small in size in comparison to present transducers, capable of withstanding shock and vibrations, and substantially insensitive to temperature variations. Transducers used in the engine compartment of a vehicle, for example, must be as small in size as possible but at the same time must be able to withstand the mechanical forces, temperature variations and other environmental conditions encountered while operating without deterioration over a long time span. Obviously, it is not desirable that the transducer have to be finely adjusted either during initial installation or in replacement.

The vehicular application is a good example of a broader problem encountered with transducers, because of the increasing usage of microprocessors in other advanced analog and digital systems which receive transducer outputs and utilize these in effecting computations or controls. The essential problem with the transducer is to provide a signal that varies linearly with the input parameter variation, in such form that it may be utilized directly by the processor. For a digital system, the common approach is to employ an analog-to-digital converter for this purpose, but this adds an undesirable increment of cost that should be avoided if possible.

SUMMARY OF THE INVENTION

In accordance with the present invention, a capacitive transducer includes separate capacitors which differentially change their values in opposite senses in response to pressure variations. In general, a deflectable diaphragm incorporates spaced-apart electrodes on two regions which differentially deflect in response to pressure variations. A small rigid plate is attached by a spacer structure to the diaphragm between the diaphragm electrodes. This rigid plate includes an electrode structure facing the diaphragm electrodes. Deflection of the diaphragm therefore causes the spacings between the facing electrode pairs to vary in opposite senses. The differential capacitance variation provides an extremely linear output despite the presence of shunt capacitance effects that may exist between the capacitor and the associated electronics.

In a more particular example of a differential capacitance transducer in accordance with the invention, a deflectable diaphragm is defined by a relatively thin portion of a ceramic member having a relatively thicker peripheral flange. The flat side of this ceramic member contains at least two spaced-apart electrodes. A plate overlying at least a portion of the deflectable diaphragm is held at a fixed reference spacing by the spacer attachment in the region between the diaphragm electrodes and has electrodes facing those on the diaphragm. With a circular diaphragm, the diaphragm electrodes lie at different radial positions relative to the central axis, and the spacers may comprise a series of arc segments lying along a radius intermediate the two electrodes. Grounded guard electrodes may be interposed between the inner and outer electrodes, to minimize interference effects between the pairs of capacitors defined by the electrodes. Thus when the diaphragm deflects to a relatively greater extent, the spacing between the diaphragm and the plate is substantially constant at the intermediate radius, but is less at the interior regions and greater at the exterior regions, thus giving rise to variations in opposite senses in the capacitance values. A ceramic diaphragm may readily be pressed and fired in mass production quantities with the needed precision. It also provides an ideal insulating base for receiving thin or thick film electrodes deposited by precision production techniques. The entire transducer may be extremely small and yet highly sensitive to small deflections caused by minute pressure or force changes.

A feature of the present invention is the provision of a diaphragm having an integral flange substantially thicker than the deflecting surface, and providing a rigid periphery that extends in a direction opposite the spaced-apart electrodes on the deflectable surface. Another aspect of devices in accordance with the present invention is the incorporation of torsion mounting means in the rigid plate, which may comprise thin web sections, relatively thin support columns or cantilevered elongated elements formed integrally with the plate. Consequently, bending and torsion forces exerted on the spacer element by the diaphragm as it flexes are absorbed by the torsion of the coupled portion of the plate. This torsional mounting prevents fracture or cracking of the spacer element, which may be a small but relatively rigid glass, metal or ceramic element.

Further in accordance with the invention, differential capacitance transducers may be employed in a novel system for generating digital value signals for a processor, indicative of the instantaneous pressure value. In this system, each capacitance of the transducer determines the frequency of a variable frequency oscillator, and these differentially varying frequencies are combined to give a difference frequency whose instantaneous rate corresponds to the instantaneous pressure. The processor need only count the number of pulses in the difference frequency occurring within a selected time interval to have a direct digital representation of the then existing pressure.

BRIEF DESCRIPTION OF THE DRAWINGS

A better understanding of the invention may be had by reference to the following description, taken in conjunction with the accompanying drawings, in which:

FIG. 4 is an exploded view of a fragment of the arrangement of FIGS. 1–3, showing details of the diaphragm, electrode, movable plate and spacer elements;

FIG. 5 is a fragmentary enlarged view of a spacer element and mounting construction utilized in the arrangement of FIGS. 1–4;

FIG. 6 is a somewhat idealized side sectional view corresponding to a portion of FIG. 2 and showing positional variations during deflection of the diaphragm;

DETAILED DESCRIPTION OF THE INVENTION

Figure 1:
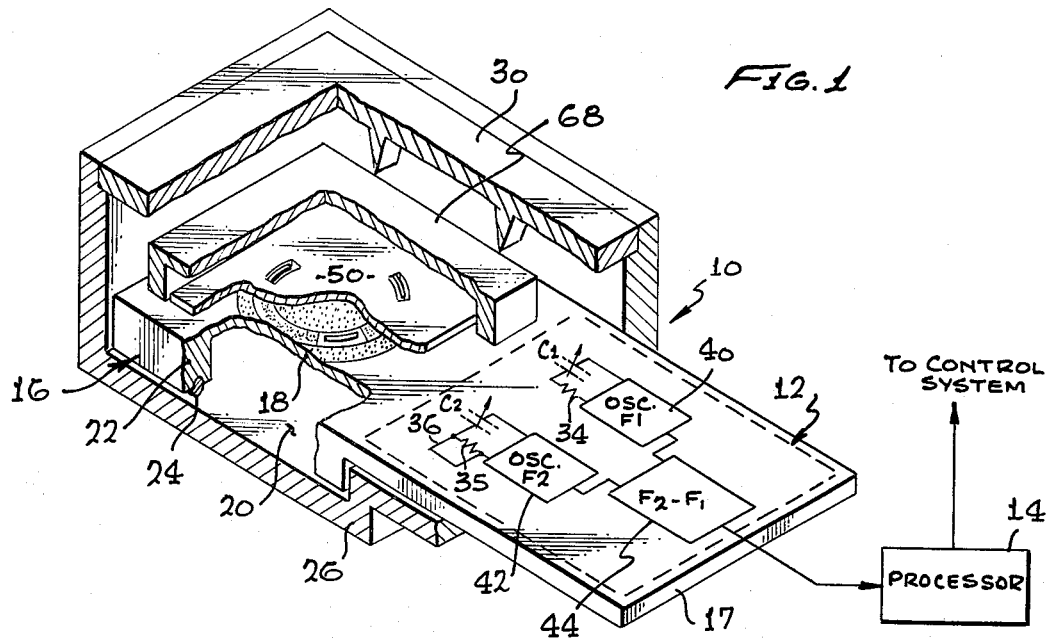
FIG. 1 is a perspective view, partially simplified and partially broken away, of a transducer device and a signal generating system in accordance with the invention.

The transducer illustrated in FIGS. 1–4, to which reference is now made, is a pressure responsive differential capacitive transducer 10 with integral electronics 12 which feeds signals to a processor 14 that may operate essential control elements in a control system (e.g. an engine fuel and emission control system). The electronics 12 are mounted in close association to a ceramic (e.g. alumina) diaphragm body 16 on an integral extension 17, for compactness and ease of handling. The diaphragm body 16, as may be best seen in FIGS. 1, 2 and 4, will be referred to as having "upper" and "lower" sides, as viewed in the figures, even though the transducer 10 may be mounted in any attitude. The principal operative portion of the diaphragm body 16 comprises a circular (in this example) relatively thin and deflectable diaphragm portion 18 formed by a cup-shaped concavity 20 concentric with a central axis for the diaphragm 18. A groove on the under side of a marginal flange 22 about the diaphragm 18 receives an O-ring 24 for seating the diaphragm body 16 against a housing base 26. The marginal flange 22 is substantially thicker than the thickness or depth of the diaphragm 18, so that only the diaphragm 18 deflects in response to a pressure variation within the concavity 20.

The housing base 26 includes an inlet fitting 28 for receiving fluid pressure to be measured, and encompasses both the diaphragm body 16 and the extension 17, the enclosure being completed by a housing cover 30.

Figure 3:
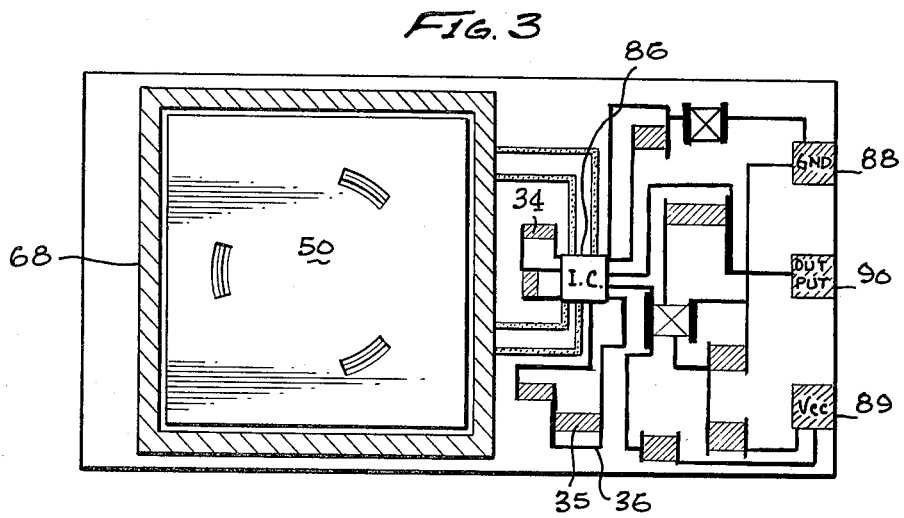
FIG. 3 is a plan sectional view, taken along the lines 3—3 in the view of FIG. 2, and looking in the direction of the appended arrows.

The electronics 12 are depicted in different form in separate FIGS. 1 and 3, with the former being idealized to show the principal operative blocks, whereas the latter is a graphical depiction of the physical disposition of circuitry used in one practical example. Inasmuch as the specific circuitry may be varied widely, consideration need be given only to the principal elements of a system for converting capacitance variations to linearly related signal values. In FIG. 1, the internal capacitance variations of the sensor within the system are represented by dotted lines, and designated $C_1$ and $C_2$ respectively. These are in a circuit with separate trim resistors 34, 35 respectively, the second of which is shunted by a conductor 36 used in laser trimming operations. The circuits comprising the internal transducer capacitances $C_1$ or $C_2$ and the associated trim resistors 34, 35 respectively, are used to control the frequency of variable frequency oscillators $F_1$ and $F_2$ (40 and 42 respectively).

These oscillators 40, 42 may comprise any of a number of commercially available integrated circuit oscillators, such as the oscillator chip sold as the RCA type CD 4069 Hex Inverter configured to operate in an astable mode. The outputs from the oscillators 40, 42 are applied to a difference generator or demodulator 44 which may comprise a conventional bistable device such as a J-K flipflop that shifts states in response to inputs received at its separate terminals. The difference generator 44 therefore provides an output pulse train over a given time period, that is representative of the difference in the two input signal trains to the processor 14. The output pulse train is not necessarily cyclic in character in this configuration but the number of output pulses in a given time span is properly representative of the frequency difference for that sample. The operative structure of the transducer 10, in the region overlying and substantially coextensive with the flexible diaphragm 18, includes a movable plate 50. Both the plate 50 and the diaphragm 18 may be molded of insulating ceramic material such as alumina, and then receive deposited pairs of electrodes on the opposed faces thereof, as best seen in FIG. 4. On the diaphragm 18, an inner electrode 52 is disposed in the region about the central axis, and extending out to a given maximum radius from the central axis. An outer electrode 54 substantially encompasses the inner electrode 52 at a greater radial spacing from the central axis. In this example the outer electrode 54 is within the deflection region of the diaphragm 18 although this need not necessarily be the case. The electrodes 52, 54 are in this example of deposited thin film conductive material, e.g. gold or silver. They may be accurately positioned and deposited to a controlled depth by conventional screening or other production techniques because of the rectangular outline of the diaphragm periphery and the flat top surface of the diaphragm body, which serve as physical references for use in production. The upper surface of the diaphragm 18 may be ground for precise flatness to aid in the fabrication. Leads 56, 58 extend from the inner and outer electrodes 52, 54 respectively, for connection to exterior circuits by conventional conductors (not shown). Grounded guard rings 59, 63 are disposed between the inner and outer electrodes 52, 54 and 60, 62 respectively. These serve to limit interactions between the capacitors defined by the electrode pairs (particularly if a conductive fluid is introduced as may happen in operative conditions) and between the oscillator circuits as well. Interactions can otherwise arise because of inter-circuit couplings when the oscillators operate at harmonic frequences. The plate inner electrode 60 and outer electrode 62 are disposed in opposition to the corresponding elements on the flexible diaphragm 18. These electrodes 60, 62 include inner and outer leads 64, 66 respectively and depending upon design considerations may be the same or somewhat different in surface area from the opposed electrodes 52, 54. In this example, the nominal spacing of the plate 50 from the diaphragm 18 is only 1 mil, and in most transducers a spacing of 10 mils down to 0.1 mil will be utilized, although substantially greater spacings can be used if desired. The electrodes may be thick or thin film (the terminology is not significant) but preferably are no greater in thickness than 10% of the spacing between facing electrodes, and more particularly are about 1% of this distance in thickness.

Figure 2:
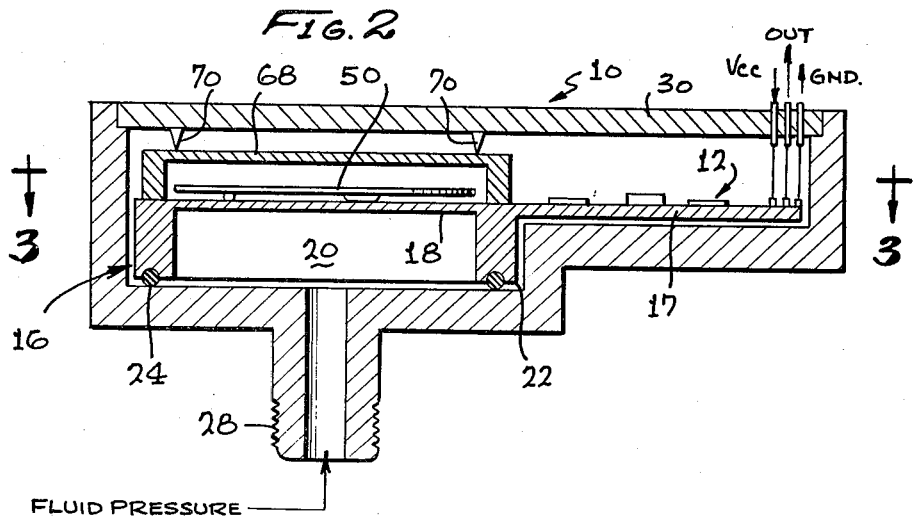
FIG. 2 is a side sectional view of the transducer device of FIG. 1.

As best seen in FIGS. 1 and 2, the movable plate 50 is encompassed by a spaced apart gas enclosure member 68 which rests against the upper surface of the diaphragm body 16 outside the deflection region of the diaphragm 18. The enclosure member 68 is sealed in gas-tight relation to the diaphragm body 16, as by a glass or solder seal (not shown in detail). Bearing elements 70, which may be spring loaded if desired, seal the O-ring 24 in the base of the diaphragm body 16 to the housing base 26. Additionally, sealing elements (not shown) may be utilized to improve protection against gas leakage, in order that the interior volume within the enclosure member 68 may be evacuated, so that absolute pressure measurements can be made and the space between the electrodes on the diaphragm 18 and the plate 50 may be gas free for greater measurement accuracy and increased reliability.

The movable plate 50 is secured to and spaced from the flexible diaphragm 18 in a selected region concentric with the central axis and intermediate the inner and outer electrode pairs. In this example, a set of three spacer beads 74, 75, 76, comprising curved arc segments lying along a given radius about the central axis provide sufficient reference points to maintain the plate 50 parallel to its initial starting plane despite deflection of the diaphragm 18. The spacer beads 74-76 are glass in this example, although they may be of ceramic or of conductive material. They may be deposited in the desired configuration and to a precise depth by well known screening techniques, following which conventional firing is used to bond the plate 50 to the diaphragm 18 via the interior spacer beads 74-76. It should be recognized that where larger spacings and less surface flatness can be tolerated the spacers may be molded directly in a part. Screen deposition techniques might still be used, but alternatively other processes such as vacuum deposition or sputtering might be employed.

As is described in more detail hereafter, the beads 74-76 must accommodate differences in movement between the rigid plate 50 and the flexing diaphragm 18. For this purpose, the plate 50 is preferably molded, as shown particularly in FIG. 5, with elongated torsion members or bars 80 coextensive with the associated spacer bead (e.g. 74). The torsion bars 80 in this example are defined by coextensive side apertures or slits 81, 82. It is convenient using molding techniques to make the torsion bar 80 of lesser height than the plate 50, as seen in FIG. 5, to provide greater absorption of torsional forces. Thus, flexure of the diaphragm causes the introduction of some torsional force into the relatively rigid glass beads 74-76, but the torsion bars 80 absorb the twisting moments thus created and prevent fracture, although the planar attitude of the plate 50 is maintained.

After fabrication of the structure of the transducer, it is preadjusted to selected nominal values by laser trimming of the trim resistors 34, 35, which can feed into the respective integrated circuits which also receive the pairs of signals representing the capacitive inputs from the inner and outer capacitor regions of the transducer. Only three output leads are connected from the transducer, namely a ground coupling 88, the energizing input voltage 89 and the output signal 90. As is common with laser trimming operations, output signal values derived from test conditions are processed by a computer that is programmed to determine the amount of reduction in resistance value that is required, and to control the laser trimming beam accordingly. The presence of the shunt conductor 36 enables the first trim resistor 34 to be set first, after which the shunt 36 is broken and the second trim resistor 35 is thereafter trimmed. Because both values are available, and can be interrelated, this initial adjustment step enables both the zero value and the overall range for the transducer 10 to be adjusted to the selected nominal amounts, so that thereafter the transducer is interchangeable with others.

The manner in which differential capacitance outputs are obtained may best be visualized from the side sectional view of FIG. 6, in which an initial starting position for the plate 50 relative to the unflexed diaphragm 18 is shown in solid lines, and the positions occupied in a flexed condition, responsive to an applied pressure P establishing a differential pressure across the diaphragm 18 is shown in dotted lines. For simplicity of visualization, the spacers 74 and 74' are shown as diametrically opposed about the central axis, even though three are used in the example of FIGS. 1-6.

Figure 7:
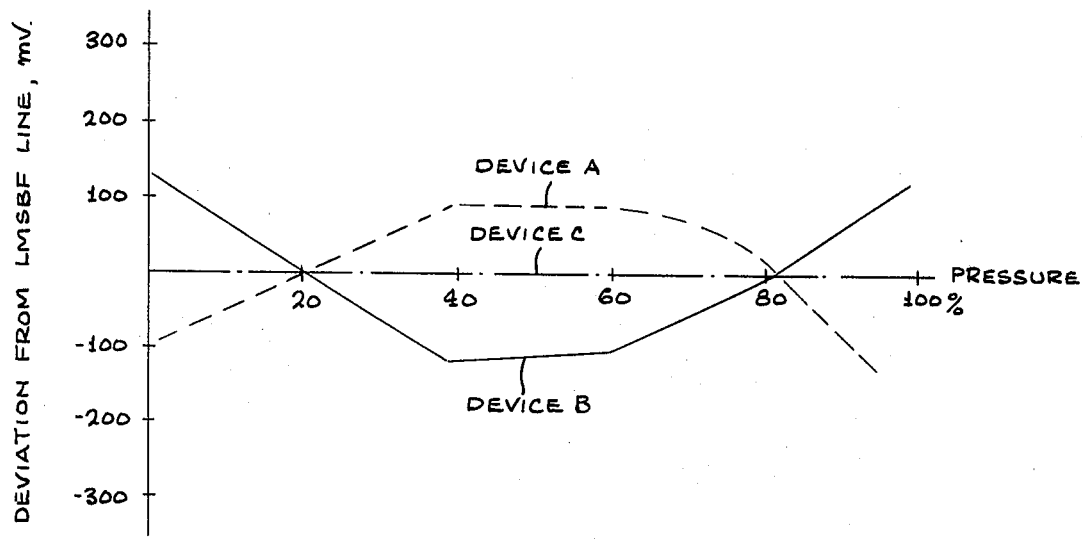
FIG. 7 is a graph of deviation from linear output as the ordinate vs. pressure as the abscissa, showing the linearity of signal output as achieved in systems in accordance with the present invention.

When the diaphragm 18 is unflexed, the distance between the inner electrode pair 52, 60 is $D_1$, and the distance between the outer electrode pair is $D_2$, and these are essentially the same (although minor variations may be accounted for during the trimming procedure). When, however, the diaphragm 18 is deflected outwardly to the dotted line position, the capacitance values between these single surfaces vary in opposite senses to give a push-pull effect. Thus the distance betwen the inner electrodes 52, 60 reduces to $D_1'$, and the distance between the outer electrodes 54, 62 increases to $D_2'$. In practice, this differential capacitive structure can be adjusted so as to give substantially exact linearity in the output signal compared to the input pressure. FIG. 7, for example, depicts linearity curves for three devices in accordance with the invention, shown as device A (dotted line), device B (solid line) and device C (dot-dash line). The plots shown are the deviations of each device from a linear best fit straight line (least mean square best fit straight line in statistical terms), depicted so that they can be more readily seen. Device A is essentially an upward bending curve in relation to pressure, so that the best fit variation is essentially positive, while device B has an inverse characteristic, so that its deviation is primarily negative. The properties of the devices are based upon design considerations, but the capability of the devices of this design for giving oppositely varying curves is what enables a balancing of parameters, so that essentially complete linearity can be achieved, as shown by the plot for device C.

Figure 9:
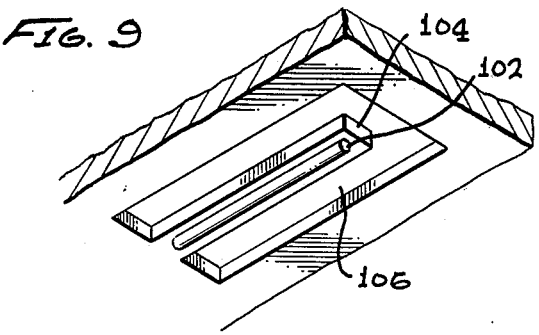
FIG. 9 is an enlarged fragmentary view of a portion of the arrangement of FIG. 8, showing the spacer and mounting construction used therein.
Figure 8:
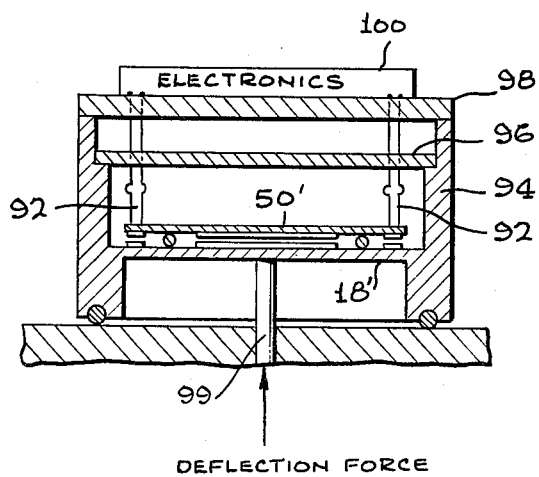
FIG. 8 is a side sectional view of a different transducer in accordance with the invention.
Figure 10:
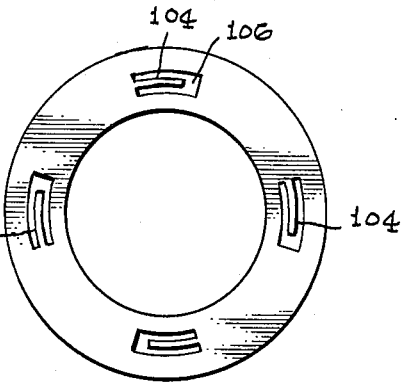
FIG. 10 is a plan view of a portion of the movable plate of FIG. 8, showing the disposition of spacers and mounts thereon.

A different construction of a transducer in accordance with the invention may utilize a substantially different configuration, as shown in FIGS. 8-10, in which like elements are given corresponding numerical designations. In FIG. 8, the diaphragm 18' functions as a load transducer, and responds to a mechanically exerted force or displacement, rather than a fluid pressure. The entire structure is circular in outline, rather than rectangular, and the electrical connections from the capacitive elements comprise flexible leads 92 which are taken upwardly through a cylindrical housing 94 to a hermetically sealed top wall 96, from whence connections are made to a transverse printed circuit board 98 upon which the electronics package 100 is mounted. In addition, as shown in FIGS. 9 and 10, a set of four spacers 102 is used at equally spaced quadrants about the central axis, again to maintain the plate 50' in a parallelism with the undeflected position of the diaphragm 18'. Torsion bars 104 for coupling to the spacers 102 are defined integral with the plate 50' by U-shaped apertures 106 which provide elongated, cantilevered torsion bar elements 104.

Figure 11:
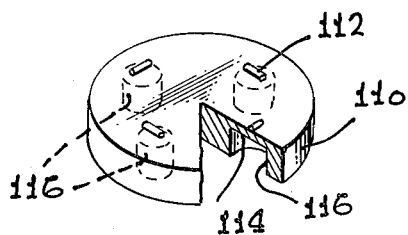
FIG. 11 is a perspective view, partially broken away, of a different example of a bending and torsion absorbing mount in accordance with the invention.

FIG. 11 depicts a different type of reference plate 110, in which torsion and bending of spacer elements 112 as a diaphragm (not shown) is deflected are absorbed in thin webs 114 defined by bores 116 in the opposite side of the plate 110 (the electrodes not being shown). The bores 116 and thin webs 114 may be formed by molding, but are more reliably defined for small parts by ultrasonic drilling using an abrasive slurry.

Transducers in accordance with the invention are typically so small that they occupy less than one cubic inch for the transducer structure itself, and if the electronics are incorporated, as in the example of FIGS. 1-5, approximately another half cubic inch is added. A combination of linearity and sensitivity is achieved, with high capacitance values being achieved at low stress levels if desired, and with hysteresis effects being minimal. These factors together with the wide range of values of pressure or other deflecting force that can be accommodated permit the transducer to be used in high precision applications on the one hand, or in ruggedized structures on the other. The differential capacitor arrangement enables solution of an algebraic problem involving four equations with four unknowns, which enables facile adjustment of zero and range for the output frequency.

While a number of modifications and variations have been described above, it will be appreciated that the invention is not limited thereto but encompasses all forms and variations falling within the scope of the appended claims.

What is claimed is:

1. A force responsive capacitive transducer comprising:
a flexible diaphragm having a face region deflectable in response to a deflecting force acting thereon and including first electrode means comprising electrically separate electrodes in at least two different regions on the deflectable face region thereof that are deflected differently in response to a deflecting force;
and movable plate means coupled to the deflectable face region of said diaphragm between the separate electrodes of said first electrode means and including second electrode means facing the first electrode means.

2. The invention as set forth in claim 1 above, wherein said diaphragm and movable plate means are of electrically insulative material and said first and second electrode means comprise deposited films, and including in addition spacer means coupling said movable plate means to said diaphragm between the separate electrodes on said diaphragm.

3. A force responsive capacitive transducer comprising:
a flexible diaphragm of electrically insulative material deflectable in response to a deflecting force acting thereon and including first electrode means comprising electrically separate deposited film electrodes in at least two different regions on one face thereof that are differently spaced from the center of deflection of the diaphragm;
movable plate means of electrically insulative material and including second deposited film electrode means facing the first electrode means;

spacer means coupling said movable plate means to said diaphragm between the separate electrodes on said diaphragm;

said movable plate means being substantially nondeformable in the region of said second electrode means during flexure of said diaphragm, and wherein said first and second electrode means define a pair of capacitive means changing in opposite senses in response to flexure of said diaphragm.

4. The invention as set forth in claim 3 above, wherein said movable plate means comprises means for absorbing torsional stresses induced in said spacer means during flexure of said diaphragm.

5. The invention as set forth in claim 4 above, including in addition means disposed on at least the diaphragm for limiting electrical interaction between the electrodes thereon.

6. The invention as set forth in claim 5 above, wherein said means for limiting electrical interaction comprises guard electrode means disposed on said diaphragm and plate between said first and second electrode means.

7. A variable capacitance device for providing readily processed signal variations in response to minute deflections of a diaphragm member comprising:

a diaphragm having a planar surface that is deflectable from the nominal plane within its interior regions, and including an integral peripheral member defining a concavity open to the deflection causing source, the peripheral member having a thickness substantially greater than that of the deflection region of the diaphragm to provide peripheral rigidity while permitting convex deflection of the central region of the diaphram, the planar surface further including first thin film electrode means thereon covering a portion of the interior regions;

a low mass plate member substantially coextensive with at least a portion of the planar surface of the diaphragm and substantially parallel thereto throughout the coextensive region when the diaphragm is not deflected, the plate member having second thin film electrode means thereon facing the diaphragm and being at a distance of the order of 1 mil from the diaphragm; and spacer means comprising a number of elements disposed between and coupled to both the diaphragm and plate, the spacer means being disposed within the deflectable region of the diaphragm to provide a spacing such that the thickness of said thin film electrode means is less than 10% of the distance between the diaphragm and plate member and maintaining the plate in a position parallel to a selected plane during deflection of the diaphragm.

8. The invention as set forth in claim 7 above, wherein the diaphragm and plate member are insulative members, and further including enclosure means encompassing said plate member and coupled to said diaphragm for maintaining a selected pressure in the region between said diaphragm and plate member.

9. The invention as set forth in claim 8 above, wherein said spacer means comprises at least three elements bonded to both the diaphragm and plate member.

10. The invention as set forth in claim 9 above, wherein said plate means includes different integral torsional means coupled to each of said elements of said spacer means.

11. The invention as set forth in claim 10 above, wherein a vacuum is maintained within the enclosure means and wherein said elements of said spacer means are deposited material bonding the diaphragm and plate together.

12. A capacitive transducer comprising:

a flexible diaphragm having a fixed periphery and a deflectable surface area interior thereto and including separate electrode means disposed on at least two portions of the surface area that are differentially deflected in response to variations in force acting on said diaphragm;

a substantially rigid plate disposed adjacent the electrode means and including electrode means in facing relation thereto to define capacitors therewith; and means coupled to the plate and the diaphragm for maintaining a fixed spacing between the plate and diaphragm between the separate electrode means, whereby the values of capacitors defined by opposed electrodes vary in opposite senses with diaphragm deflection.

13. The invention as set forth in claim 12 above, wherein said diaphragm has an essentially flat deflectable surface and a central axis and the separate electrode means are disposed at different radial positions relative to a central axis on the flat surface, and wherein said means for maintaining a fixed spacing comprises spacer elements disposed at radial positions intermediate the separate electrode means.

14. The invention as set forth in claim 13 above, wherein said diaphragm further has an integral peripheral member defining a pressure receiving concavity on the side opposite the electrode means.

15. The invention as set forth in claim 14 above, wherein said transducer further comprises enclosure means encompassing said plate and coupled to said diaphragm for maintaining a low pressure in the region of the electrode means.

16. The invention as set forth in claim 15 above, further including a body for supporting said diaphragm and wherein the peripheral member includes resilient seal means engaging said body.

17. The invention as set forth in claim 16 above, wherein said diaphragm and plate are of ceramic material and said electrode means are thin films.

18. The invention as set forth in claim 17 above, wherein said diaphragm has a rectangular configuration including an extension outside the peripheral member, wherein said plate is substantially coextensive at least with the electrode-bearing portion of the diaphragm and including in addition electronic circuit elements mounted on the extension of the diaphragm.

19. The invention as set forth in claim 14 above, wherein the electrode means on each of said diaphragm and plate comprise an outer ring and an inner disc, and means providing exterior electrical connection thereto.

20. The invention as set forth in claim 19 above, including in addition grounded guard electrode means on each of said diaphragm and plate disposed between said outer ring and inner disc.

21. A capacitive transducer comprising:

a substantially planar-faced member having first and second electrodes at spaced-apart regions thereon;

a deflectable diaphragm in facing relation to the planar face of the member and having electrode means facing the first and second electrodes respectively to define first and second capacitive means; and spacer means disposed between the member and diaphragm and coupling the member to the diaphragm to maintain a fixed reference distance therebetween in the region between the first and second electrodes.

22. A capacitive transducer as set forth in claim 21 above, including in addition first and second variable frequency oscillator means coupled to said first and second capacitive means respectively and varying in frequency with the value thereof, and means responsive to said first and second variable frequency oscillator means for providing a varying frequency difference signal.

23. A capacitive transducer as set forth in claim 22 above, wherein said variable frequency oscillator means each includes a trim resistor in circuit therewith, said diaphragm having a circuit board extension and said trim resistors and oscillator means being mounted on the circuit board extension.

24. A capacitive transducer as set forth in claim 21 above, wherein said deflectable diaphragm has a circular deflection area concentric with a central axis with the first and second electrodes lying at different radial regions, and wherein said spacer means is disposed along a radius between the first and second electrodes, such that deflection of the diaphragm causes changes in opposite senses in the spacing between facing electrode pairs.

25. The invention as set forth in claim 24 above, including in addition body means for supporting said diaphragm, and wherein said diaphragm has a peripheral flange on the side opposite to the electrodes and coupled to said body means, and defining therewith an interior volume adjacent to the deflectable portion of the diaphragm for receiving an interior fluid pressure and communicating the interior pressure thereof to the deflectable diaphragm.

26. The invention as set forth in claim 25 above, wherein the diaphragm has a deflectable electrode bearing surface substantially less in thickness than the thickness of the peripheral flange, wherein said body means includes a base for receiving the peripheral flange of the diaphragm and means engaging the opposite side of the diaphragm for holding the diaphragm in position, and including in addition seal means coupling the peripheral flange of the diaphragm to the base of the body means.

27. The invention as set forth in claim 26 above, wherein said transducer further includes means hermetically enclosing the substantially planar-faced member to maintain a substantially constant low pressure thereabout.

28. A force responsive device for providing differential signal outputs, comprising:
a pair of insulating members having spaced apart, opposing surfaces, a first of the members being deflectable convexly toward the other in response to an applied force;
spacer means disposed between the insulating members and coupled thereto, the spacer means being positioned in the deflection region of the first member to maintain the second of the members in a plane symmetrically disposed to the first of the members and defining inner and outer deflection regions relative thereto;
first capacitive means disposed in the inner deflection region and varying in accordance with the spacing between the members thereat; and
second capacitive means disposed in the outer deflection region and varying in accordance with the spacing between the members thereat.

29. The invention as set forth in claim 28 above, further including means cooperating with the second of the members to absorb torsional forces acting on the spacer means as the first of the members deflect.

30. The invention as set forth in claim 29 above, further including grounded electrode means disposed between said first and second capacitive means.

31. A pressure transducer comprising:
a diaphragm responsive to a differential pressure applied to the faces thereof;
a plate substantially overlying said diaphragm;
spacer means disposed between said diaphragm and plate in an interior deflecting portion of the diaphragm, for providing a fixed spacing thereat such that the distance between the diaphragm and said plate changes differentially on opposite sides of said spacer means;
first capacitive means mounted between said diaphragm and plate and responsive to relative position changes thereof in a region on one side of said spacer means; and
second capacitive means mounted between said diaphragm and plate and responsive to relative position changes thereof in the region on the other side of said spacer means.

32. A system for providing, to a digital processor, digitally valued signals representative of force variations comprising:
force transducer means comprising a deflectable diaphragm having at least two differentially deflected electrode means thereon and an electrode bearing reference plate affixed to the diaphragm between the two electrode means and movable therewith, the transducer means providing oppositely varying capacitive values in response to force variations;
first and second variable frequency oscillators, each coupled to the transducer means and responsive to the capacitive value of each for providing first and second variable frequency signals representative of force variations; and
means responsive to the first and second signals for generating a third variable frequency signal representative of the difference between the first and second signals, whereby the processor can count the number of cycles in successive time samples of the third signal to determine successive force values.

33. A system for providing, to a digital processor, digitally valued signals representative of force variations comprising:
force transducer means including different capacitance means providing oppositely varying capacitive values in response to force variations, said transducer means comprising a deflectable diaphragm having at least two differentially deflected electrode means thereon;
first and second variable frequency oscillators, each coupled to the transducer means and responsive to the capacitive value of each for providing first and second variable frequency signals representative of force variations;
means responsive to the first and second signals for generating a third variable frequency signal representative of the difference between the first and second signals, whereby the processor can count the number of cycles in successive time samples of the third signal to determine successive force values; and
said force transducer means further including externally trimmable resistors in circuit with the different capacitance means coupled to the different oscillators and additionally varying the time constant to determine the frequency of the different oscillators, whereby the zero and range of the transducer means can be adjusted to selected nominal values by trimming the resistors, to enable different transducer means to be used interchangeably.

34. In a transducer having a deflectable diaphragm bearing at least one electrode, the combination comprising:
an electrode-bearing member disposed opposite the diaphragm and forming variable capacitance means therewith;
substantially rigid spacer means disposed in the deflection region of the diaphragm and coupling the diaphragm to the electrode-bearing member; and
means coupled to said electrode-bearing member for absorbing bending and torsional forces exerted on said spacer means during deflection of said diaphragm.

35. The invention as set forth in claim 34 above, wherein said deflectable diaphragm has a circular periphery and at least two spaced-apart electrodes at different radii from the central axis thereof, wherein said electrode-bearing member has electrodes facing the electrodes of said diaphragm to define a pair of capacitance means at different radii positions, and wherein said spacer means is disposed at a radius intermediate the pair of capacitance means.

36. The invention as set forth in claim 34 above, wherein said means for absorbing bending and torsional forces comprises means defining thin web portions in parts of said electrode-bearing member in engagement with said spacer means.

37. The invention as set forth in claim 34 above, wherein said means for absorbing bending and torsional forces comprises elongated means formed integrally with said electrode-bearing member.

38. The invention as set forth in claim 37 above, wherein said spacer means comprises at least two spaced apart arc segment lengths of deposited fused material bonding the diaphragm and plate together.

39. The invention as set forth in claim 38 above, wherein said elongated means comprises torsional columns in said electrode-bearing member at least coextensive with and coupled to each of said different arc segment lengths and defined at least partially by adjacent arc shaped slots in said electrode-bearing member.

40. The invention as set forth in claim 39 above, wherein said torsional columns have a thickness less than that of said electrode-bearing member.

41. The invention as set forth in claim 38 above, wherein said elongated means comprises elongated cantilever elements in said electrode-bearing member at least coextensive with and coupled to each of said different arc segment lengths and defined at least partially by substantially U-shaped orifices in said electrode-bearing member.

42. In a pressure transducer having a flexible diaphragm that responds in a deflection region to a differential pressure and incorporates electrode means for sensing deflection on one side thereof, the improvement comprising:
a ceramic diaphragm having a flat surface on the side facing the electrode means and an integral peripheral member defining a concavity open to the pressure medium on the opposite side from the electrode means, with the peripheral member having a thickness substantially greater than that of the deflection region of the diaphragm to provide peripheral rigidity while permitting convex deflection of the central region of the diaphragm;
a body member facing the peripheral member on the side opposite the electrode means;
a resilient element seated between the peripheral member and the body member to seal the peripheral member to the body member; and
second electrode means on the flat surface of the diaphragm.

* * * * *